(12) United States Patent
Varley et al.

(10) Patent No.: US 11,036,590 B2
(45) Date of Patent: Jun. 15, 2021

(54) REDUCING GRANULARITY OF BACKUP DATA OVER TIME

(71) Applicant: salesforce.com, inc., San Francisco, CA (US)

(72) Inventors: Ian Varley, Austin, TX (US); Lars Hofhansl, Orinda, CA (US)

(73) Assignee: salesforce.com, inc., San Francisco, CA (US)

( * ) Notice: Subject to any disclaimer, the term of this patent is extended or adjusted under 35 U.S.C. 154(b) by 392 days.

(21) Appl. No.: 15/448,510

(22) Filed: Mar. 2, 2017

(65) Prior Publication Data

US 2018/0253357 A1    Sep. 6, 2018

(51) Int. Cl.
*G06F 11/14* (2006.01)
*G06F 16/215* (2019.01)
*G06F 16/21* (2019.01)

(52) U.S. Cl.
CPC ........ *G06F 11/1451* (2013.01); *G06F 16/215* (2019.01); *G06F 16/219* (2019.01); *G06F 2201/835* (2013.01)

(58) Field of Classification Search
CPC .. G06F 16/221; G06F 11/1456; G06F 16/217; G06F 16/248; G06F 11/1451
See application file for complete search history.

(56) References Cited

U.S. PATENT DOCUMENTS

| | | | | |
|---|---|---|---|---|
| 8,364,648 | B1* | 1/2013 | Sim-Tang | G06F 16/20 707/674 |
| 8,862,639 | B1* | 10/2014 | Rao | G06F 16/219 707/813 |
| 10,402,910 | B1* | 9/2019 | Kunz | G06Q 40/12 |
| 2013/0232123 | A1* | 9/2013 | Ahmed | G06F 11/1004 707/690 |
| 2015/0032698 | A1* | 1/2015 | Cochrane | G06F 16/128 707/638 |
| 2016/0179853 | A1* | 6/2016 | Bertin | G06F 16/113 707/662 |
| 2017/0132089 | A1* | 5/2017 | Roehrsheim | G06F 11/3006 |
| 2017/0277708 | A1* | 9/2017 | Sarangi | G06F 16/17 |
| 2019/0034294 | A1* | 1/2019 | Tirado | G06F 11/1469 |

* cited by examiner

*Primary Examiner* — Mariela Reyes
*Assistant Examiner* — Courtney Harmon
(74) *Attorney, Agent, or Firm* — Holland & Hart LLP

(57) ABSTRACT

A database may store a plurality of database revisions corresponding to a time period, including a current version and one or more backup versions of a data object. After a threshold time has passed, the database may identify a plurality of time intervals within the time period and identify, for each of the plurality of time intervals, at most one database revision corresponding to the time interval. The database may delete, for each of the plurality of time intervals, all of the database revisions except for the identified at most one database revision. The database may periodically repeat this process to reduce the granularity of backup data over time.

16 Claims, 10 Drawing Sheets

US 11,036,590 B2

REDUCING GRANULARITY OF BACKUP DATA OVER TIME

FIELD OF TECHNOLOGY

The present disclosure relates generally to database systems and data storage, and more specifically to reducing granularity of backup data over time.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A database system may keep track of changes to stored data over time. In some cases, a database system may store a new version of the data each time a change is made. The multiple versions of the data may be used to restore the data to before or after any previous change. However, storing multiple versions of data may result in an inefficient use of resources and may be infeasible in some cases.

DETAILED DESCRIPTION

A database system may be configured to store large amounts of data (e.g., tens of terabytes per day) and may track changes made to the data over time. In some cases, the database system may track changes by storing a new version of the data each time a change is made. These versions may be used to restore the data to a previous state. However, in the case of large data sets, storing multiple versions of the data indefinitely may be inefficient or infeasible due to the amount of storage space needed.

In accordance with aspects of the present disclosure, the database system may be configured to reduce the granularity of the backup data over time. For example, the database system may identify time intervals within a particular time period and delete some versions of the data from each time interval. After a threshold time period has passed, the granularity of the backup data may be further reduced by lengthening the time intervals and deleting additional versions of the data from each time interval. The level of granularity reduction may be based on the age of the backup data. For example, the backup data granularity may be finer for newer versions of the data than for older versions. By managing the backup data in this way, the database system may be able to retain the functionality of restoring previous versions of the data while efficiently reducing the amount of storage space occupied by the data.

The database system may also be configured to store the previous versions of data and perform the granularity reduction process on a secondary backup database (e.g., at a disaster recovery (DR) data center). To ensure that the primary database and the secondary database stay in sync, the database system may be configured to perform a checksum operation at each database and compare the results.

Aspects of the disclosure are initially described in the context of computing environments that support managing the storage and deletion of multiple versions of stored data. Aspects of the disclosure are then described with reference to an example of a timeline that supports data storage and version management at a database. Aspects of the disclosure are further illustrated by and described with reference to apparatus diagrams, system diagrams, and flowcharts that relate to reducing granularity of backup data over time.

Figure 1:
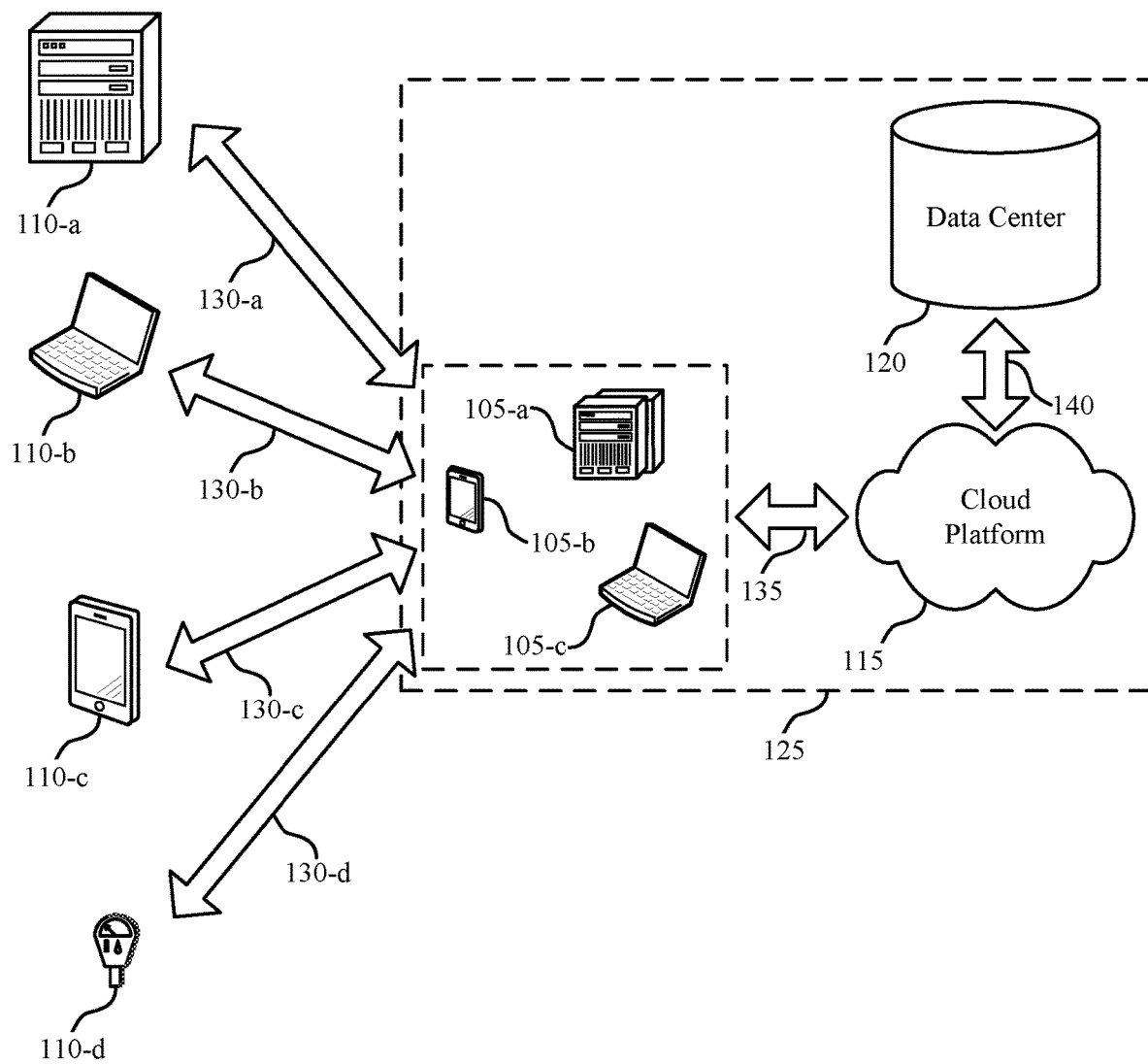
FIGS. 1 and 2 illustrate examples of environments for data storage that support reducing granularity of backup data over time in accordance with aspects of the present disclosure.

FIG. 1 illustrates an example of an environment 100 for cloud computing that supports reducing granularity of backup data over time in accordance with various aspects of the present disclosure. The environment 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

System 125 may include cloud clients 105, cloud platform 115, and data center 120. In some cases, data processing may occur at any of the components of system 125, or at a combination of these components. In some cases, servers may perform the data processing. The servers may be a cloud client 105 or located at data center 120.

Data center 120 may include a distributed database system. For example, data center 120 may be an example of an HBase database system. HBase may be configured to track changes made to data over time by storing a new version of a data object each time a change is made. The multiple versions may include a current version of the data, and one or more backup versions of the data. HBase may store multiple versions of a data object in the same data row, along with timestamps for each version. This process may be repeated each time a change is made to the data object.

Storing a new version of a data object each time a change is made may take up a large amount storage resources within HBase, especially when the data set being stored is large (e.g., multiple petabytes). To recover storage space, HBase may be configured to periodically perform a compaction process. In some cases, HBase may delete older versions of the data objects during these compactions. For example, HBase may determine how much time has passed since the timestamp of a version of the data object, and may delete the version or mark the version for deletion if a threshold time has passed. However, deleting all versions of data after a specified amount of time may result in the deletion of valuable information about how the data object has changed over time. For example, if the threshold time is one month, deleting versions in the above manner may delete all versions of the data stored over a month ago. In some cases, a user (e.g., a cloud client 105) may wish to restore at least some older versions of data to reconstruct how the data has changed over time.

In accordance with aspects of the present disclosure, HBase may be configured to reduce the granularity of the stored versions over time. For example, HBase may receive and store multiple versions of a same data object during a day, as well as during a single hour of the day. Once a threshold time (e.g., a week) has passed since the end of the day, HBase may reduce the granularity of the stored versions. For example, reducing the granularity may involve deleting backup data so that there is at most one data version stored for each hour. HBase may identify time intervals (e.g. 24 time intervals, each spanning an hour) for the day, and may select up to one version of the data object stored during each time interval (e.g., the data object with the latest timestamp). HBase may mark the rest of the versions of the data object for deletion, other than the selected version. In this way, HBase may recover data storage resources, while still storing some intermittent versions of the data object. After some additional time has passed, HBase may further reduce the granularity of the stored backups by repeating the above process.

Figure 2:
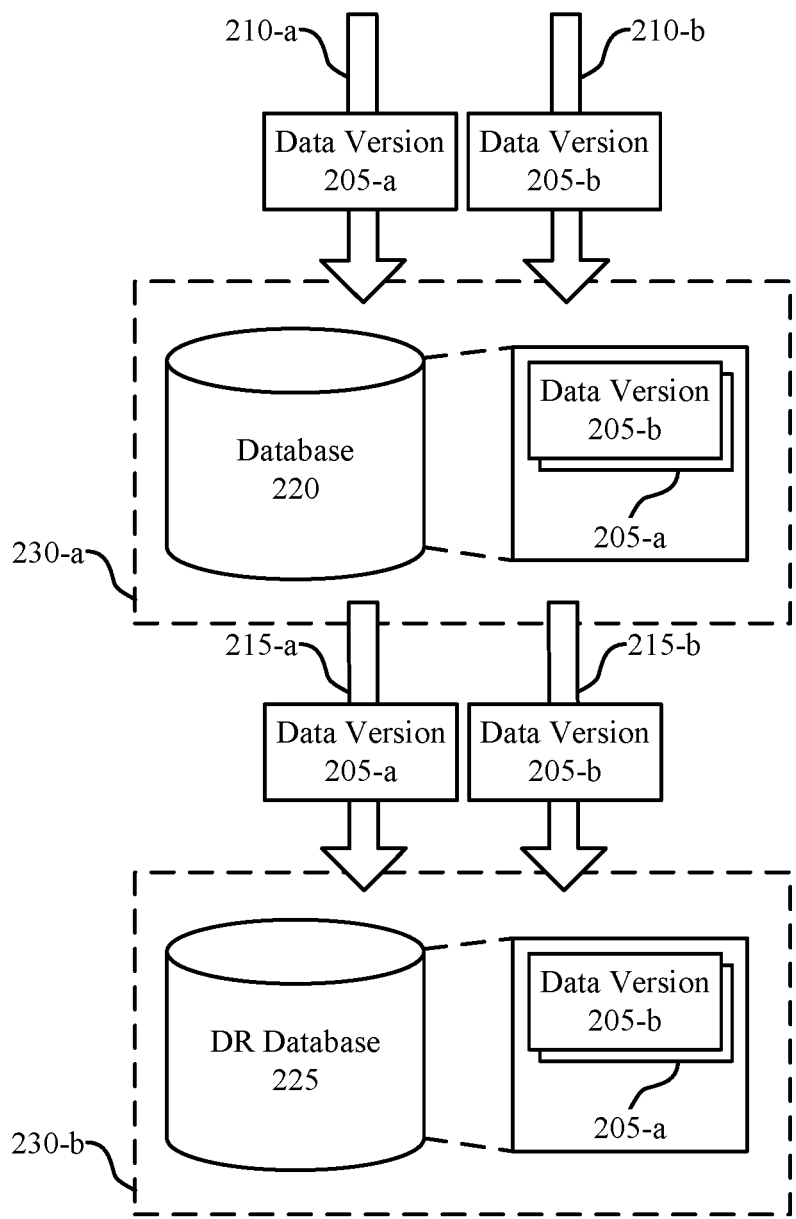

FIG. 2 illustrates an example of an environment 200 that supports reducing granularity of backup data over time in accordance with various aspects of the present disclosure. The environment 200 may include systems 230-a and 230-b, which may include database 220 and DR database 225, respectively. Systems 230-a and 230-b may each be examples of a system 125, and database 220 and DR database 225 may each be examples or components of a data center 120 as described with reference to FIG. 1. The systems 230-a and 230-b may be physically located at different geographic locations. The systems 230-a and 230-b may be configured to reduce the granularity of backup data over time while periodically performing check functions to ensure the two systems stay in sync.

Database 220 may be referred to as a primary database for a client or user. The client may send data (e.g., data versions 205) to database 220, and database 220 may send instances of the data to DR database 225 for disaster recovery. Both database 220 and DR database 225 may reduce the granularity of data versions over time, while keeping the instances of data versions stored consistent between the two types of databases.

System 230-a may receive a first data version 205-a over communication link 210-a. The first data version 205-a may represent the first time the data object was written to database 220. In some cases, first data version 205-a may include a timestamp (e.g., a user defined timestamp). In other cases, system 230-a or database 220 may automatically generate a timestamp to include with first data version 205-a when it is written to database 220. First data version 205-a may be stored in a row of database 220.

At a later time, system 230-*a* may receive second data version 205-*b* over communication link 210-*b*, where second data version 205-*b* and first data version 205-*a* are different versions of the same data object. The second data version 205-*b* may represent some changes made to the data object as compared to the first data version 205-*a*. In some cases, system 230-*a* may receive first and second data versions 205-*a* and 205-*b* over the same communication link 210.

Second data version 205-*b* may have a timestamp associated with it (e.g., specified by a user or automatically generated) that may indicate a later time than the timestamp associated with first data version 205-*a*. Database 220 may store second data version 205-*b*, for example, in the same row as first data version 205-*a*. If a user sends a request for the data object to database 220, database 220 may return second data version 205-*b* (e.g., the current version) to the user based on the later timestamp, and may not return first data version 205-*a* (e.g., a backup version).

In some cases, database 220 may backup data at DR database 225 within system 230-*b*. Database 220 may utilize write-ahead logging (WAL) to write the data to DR database 225. When database 220 stores first data version 205-*a* and second data version 205-*b*, database 220 may transmit instances of first data version 205-*a* and second data version 205-*b* to system 230-*b* over communication links 215-*a* and 215-*b*. Communication links 215-*a* and 215-*b* may also be referred to as replication streams, and in some cases first and second data versions 205-*a* and 205-*b* are transmitted over a same replication stream 215. System 230-*b* may receive first and second data versions 205-*a* and 205-*b*, and may store them in DR database 225. In some cases, first data version 205-*a* and second data version 205-*b* may be stored in the same row of DR database 225. First data version 205-*a* and second data version 205-*b* may include the same timestamps as the respective instances of the data versions 205 stored in database 220, or may receive new timestamps when they are written to DR database 225.

In some cases, database 220 may identify time periods or intervals to group the data stored at database 220. These time periods may be of equal length, or of varying length. In one example, database 220 may identify time periods with lengths of one hour. A predetermined threshold amount of time may pass after one of the identified time periods. Database 220 may reduce the granularity of data versions 205 stored during the identified time period based on the predetermined threshold amount of time passing. Database 220 may further identify time intervals within the identified time period. In some cases, first data version 205-*a* and second data version 205-*b* may have been stored at database 220 during a same time interval.

After the predetermined threshold amount of time has passed since the identified time period, database 220 may identify that the first data version 205-*a* and second data version 205-*b* each include a timestamp that indicates a time within the same time interval. Database 220 may select second data version 205-*b* based on its timestamp indicating a later time than the timestamp of first data version 205-*a*, and may delete first data version 205-*a* (e.g., in some cases, marking first data version 205-*a* for deletion, and later not rewriting it during a merge or compaction process). Database 220 may repeat this process for each time interval within the identified time period.

DR database 225 may also reduce the granularity of its stored data versions 205. In some cases, DR database 225 may perform the same process as database 220 to delete some data versions 205 within the same time intervals as identified by database 220. Whether or not DR database 225 performs this reduction of granularity, database 220 and DR database 225 may periodically check to make sure that they are storing the same data versions 205 of data objects. For example, database 220 and DR database 225 may each run functions (e.g., order-independent checksum functions) to determine if they contain the same current versions and backup versions of data objects. Database 220 and DR database 225 may compare the results of the order-independent checksum functions.

In some cases, if the results of the order-independent checksum functions indicate a difference between the data versions 205 stored in database 220 and DR database 225, the database 220 or DR database 225 may notify a user that further analysis is needed. In other cases, system 230-*b* may modify the data versions 205 stored in DR database 225 to match the instances of data versions 205 stored in database 220. For example, database 220 may delete first data version 205-*a* (i.e., a version of a specific data object) following a reduction of granularity. However, due to some syncing error, DR database 225 may still be storing data version 205-*a*. Database 220 and DR database 225 may perform checksum functions on the row of data containing the specific data object. If the two checksum functions result in different values, either system 230-*a* or system 230-*b* may indicate to a user that further analysis is required. The user may identify that DR database 225 contains first data version 205-*a* while database 220 does not, and may delete first data version 205-*a* from DR database 225 based on this identification.

Figure 3:
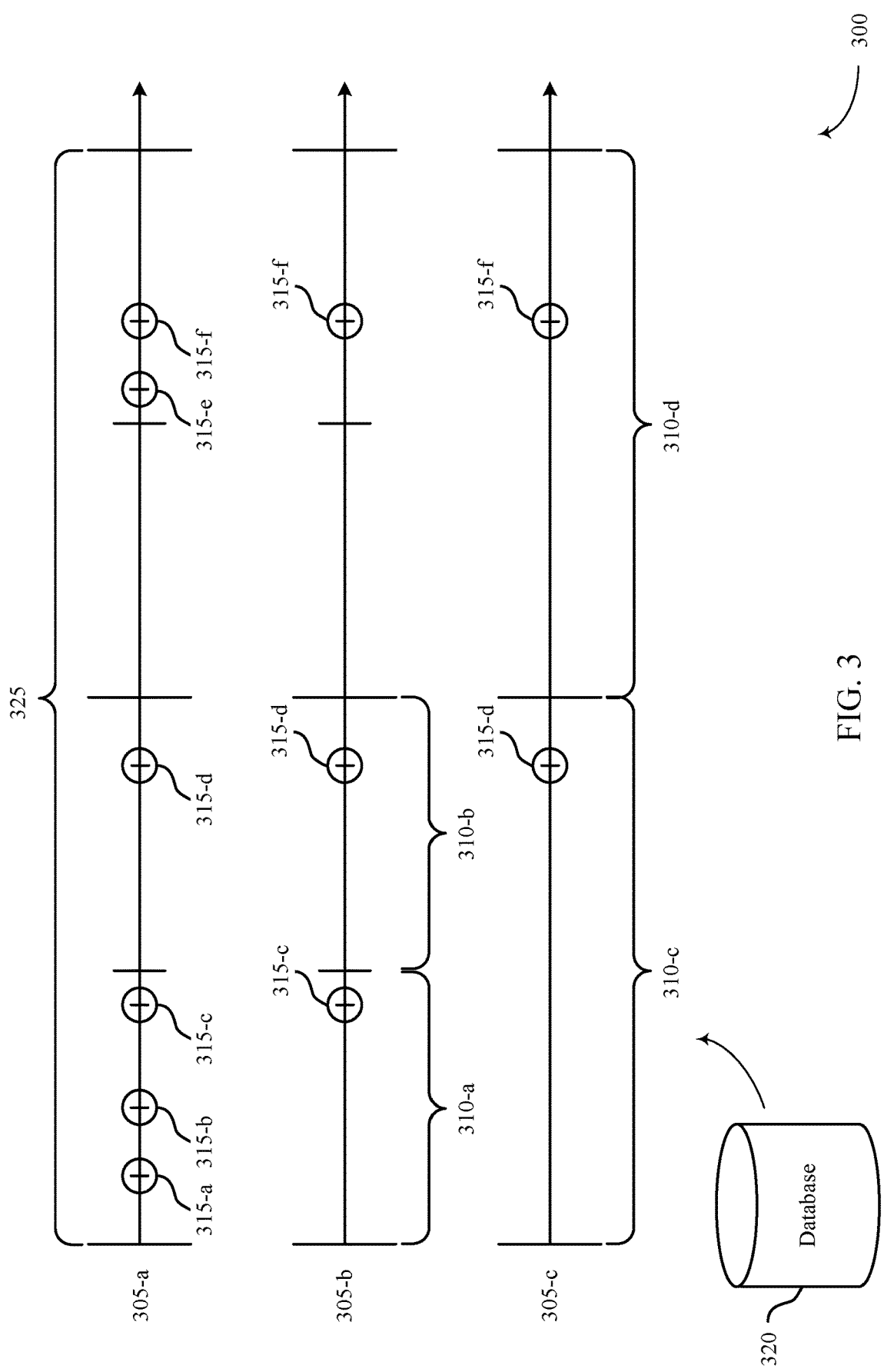
FIG. 3 illustrates an example of a timeline that supports reducing granularity of backup data over time in accordance with aspects of the present disclosure.

FIG. 3 illustrates an example of a timeline 300 that shows reducing granularity of backup data over time in accordance with various aspects of the present disclosure. The process illustrated by timeline 300 may be performed by a database 320, which may be an example of a data center 120 or database 220 as described with reference to FIGS. 1 and 2. The time period 325 for the timeline 300 may be any configurable duration (e.g., a single day). The timeline 300 includes three different timelines (305-*a*, 305-*b*, and 305-*c*) that illustrate the number of versions 315 of a data object stored at database 320 at a first time, a second time, and a third time. The three timelines 305-*a*, 305-*b*, and 305-*c* illustrate the reduction of granularity of versions 315 over time.

Database 320 may be configured to store multiple versions 315 of one or more data objects to keep track of how the data object changes over time. For example, timeline 305-*a* illustrates six versions (315-*a*, 315-*b*, 315-*c*, 315-*d*, 315-*e*, and 315-*f*) of a data object over the course of time period 325. Timeline 305-*a* may represent every change made to the data object, and may therefore include the highest level of backup granularity as compared to the other timelines 305-*b* and 305-*c*. In some cases, there may be hundreds or even millions of versions 315 of a data object stored in the database 320. Each version 315 of a data object may be created in response to a change in the data object and may include a change log that captures one or more changes made to the data object with respect to an original version or a baseline version of the data object.

Each version 315 of a data object may include or be associated with a timestamp (e.g., a long integer value measured in milliseconds). The database 320 may automatically create a timestamp for the version 315 of the data object to indicate a time that the version 315 of the data object was stored in the database 320. In some cases, the timestamp may indicate a range of time rather than a specific time. The database 320 may periodically (e.g., every 3 months) collapse the change logs and update the baseline or steady-state version of the data object (e.g., incorporate the changes indicated in the change logs into the steady-state version of the data object).

The process of reducing the granularity of backup data may include a determination by the database 320 that a first threshold time has passed since either the beginning or the expiration of the time period 325. For example, if the time period 325 is one week, the first threshold time may be measured from when the week ends. The first threshold time may represent the time gap between the time corresponding to timeline 305-a and the time corresponding to timeline 305-b.

Referring to timeline 305-b, the database 320 may identify a first set of time intervals 310, including time interval 310-a and time interval 310-b. The time intervals 310 may be defined by a first periodicity (e.g., every 24 hours). The length of the time intervals 310 may be manually or automatically configured based on the duration of period 325 or some other criteria.

The database 320 may identify the versions 315 of the data object that are within a particular time interval 310. For example, the database 320 may identify versions 315-a, 315-b, and 315-c within time interval 310-a and version 315-d within time interval 310-b. The identification may be based on the timestamps associated with each version 315. The database 320 may then select at most one version 315 of the data object from each time interval 310 (e.g., select data version 315-c from time interval 310-a). In some cases, for each time interval 310, the database 320 may select the data version 315 with the most recent timestamp (e.g., select data version 315-c in time interval 310-a because its timestamp is later in time than the timestamps for data versions 315-a and 315-b). If the time interval 310 only includes one version (e.g., time interval 310-b only includes version 315-d), then the database 320 may select the one version by default. If the time interval 310 does not include any version 315 (e.g., the data object was not changed during that time interval 310), then the database 320 may not select any version 315 corresponding to that time interval 310.

For each time interval 310, the database 320 may be configured to delete all of the identified versions 315 other than the selected version 315 (e.g., delete versions 315-a and 315-b from time interval 310-a). In some cases, deleting may involve marking the appropriate versions 315 with delete markers and not replicating any versions 315 marked with a delete marker during a compaction process of the database 320. The database 320 may repeat the above process for each time interval 310 of the time period 325. The timeline 305-b represents the remaining versions 315 stored in database 320 after this first process of granularity reduction is complete. According to this exemplary process, the database 320 has reduced the number of versions 315 stored by 50% while retaining a record of how the data has changed over time.

The database 320 may further reduce the granularity of the stored versions 315 of a data object after a second threshold time has passed since either the start or the expiration of the time period 325 (e.g., three weeks after the end of time period 325). The second threshold time may be longer than the first threshold time. Referring to timeline 305-c, the database 320 may identify a second set of time intervals 310 (e.g., time intervals 310-c and 310-d) that are defined by a second periodicity. In some examples, the second periodicity is longer than the first periodicity (e.g., time interval 310-c is longer than time interval 310-a).

The database 320 may repeat the process described above of selecting at most one version 315 from each time interval 310 and deleting all the versions 315 from each time interval 310 other than the selected versions 315. The timeline 305-c represents the remaining versions 315 stored in database 320 after this second process of granularity reduction is complete. In this way, the database 320 may repeatedly reduce the granularity of stored versions 315 of a data object as time passes while still retaining some versions 315 from older time intervals 310.

In one example, database 320 is an HBase and the data object includes a client type identifier. The client type identifier may indicate a potential client, a current client, a former client, etc. The database 320 may store version 315-a of the client type identifier indicating a potential client at 1:02 p.m. on Monday, January 2. The database 320 may automatically timestamp version 315-a of the client type identifier to indicate this time and date (e.g., timestamp=1483387320000). At 1:15 p.m. on January 2, the client type identifier may be modified to indicate a current client. Upon modification, the current version 315-b of the client type identifier stored in the database 320 may indicate a current client, but the database 320 may also include the backup version 315-a of the client type identifier indicating a potential client and with a timestamp indicating 1:02 p.m.

The client type identifier may then be modified to indicate a potential client again at 1:48 p.m. (e.g., the current client indication at 1:15 p.m. may have been made in error) and stored as version 315-c, then a current client again at 3:30 p.m. (stored as version 315-d), a former client at 8:08 p.m. (stored as version 315-e), and finally a current client once more at 8:20 p.m. (stored as version 315-f). At the end of the day on January 2 (e.g., at the end of time period 325), the database 320 may store the current version 315-f of the client type identifier indicating a current client and five backup versions (i.e., versions 315-a, 315-b, 315-c, 315-d, and 315-e) of the client type identifier with five different timestamps.

At the end of the day on Monday, January 9, the database 320 may identify that a threshold time (i.e., a week) has passed since an expiration of time period 325. The database 320 may identify a set of time intervals with a certain periodicity, such as an hour, within the time period 325 of Monday, January 2. For a particular interval of the set of intervals (e.g., interval 310-a from 1:00 p.m. to 2:00 p.m.), the system may identify any versions 315 of the client type identifier with a timestamp that falls within interval 310-a. In this example, the system may identify three versions 315 of the client type identifier: version 315-a with a potential client at 1:02 p.m., version 315-b with a current client at 1:15 p.m., and version 315-c with a potential client at 1:48 p.m.

The database 320 may select at most one version 315 of the data object from interval 310-a. The system may select the most recent version 315 of the data object within interval 310-a, for example version 315-c with the potential client and a timestamp indicating 1:48 p.m. The database 320 may mark the other two versions of the data object, versions 315-a and 315-b, for deletion. The database 320 may perform a similar process for the other time intervals 310 for Monday, January 2. For example, the database 320 may identify any versions 315 of the data object timestamped for 2:00 p.m. to 3:00 p.m. on January 2, any versions 315 of the data object timestamped for 3:00 p.m. to 4:00 p.m., etc. In this example, the database 320 may not identify any versions 315 of the client type identifier from 2:00 p.m. to 3:00 p.m., so the system may not mark any versions 315 for deletion. Additionally, the system may identify version 315-d of the client type identifier from 3:00 p.m. to 4:00 p.m., may identify version 315-d as the latest, and only, version in the interval 310-b, and may not mark any versions 315 for deletion in time interval 310-b.

During a compaction process, the database 320 may rewrite the versions 315 without delete markers (e.g., version 315-c with the potential client and a timestamp indicating 1:48 p.m. and version 315-d with the current client and a timestamp indicating 3:30 p.m.) and may not rewrite the versions with delete markers (e.g., version 315-a with the potential client and a timestamp indicating 1:02 p.m. and version 315-b with the current client and a timestamp indicating 1:15 p.m.).

The database 320 may identify that a second threshold time (e.g., a month) has passed since the expiration of the time period 325 at the end of the day on Thursday, February 2. The database 320 may then identify a second set of time intervals 310, including time intervals 310-c and 310-d. The database 320 may identify the versions 315 with timestamps within each time interval 310-c and 310-d. The database 320 may then repeat the process of selecting at most one version 315 from each time interval 310-c and 310-d. During a second compaction process, the database 320 may replicate the versions 315 without delete markers (e.g., version 315-d), and may not replicate the versions 315 with delete markers (e.g., version 315-c).

Figure 4:
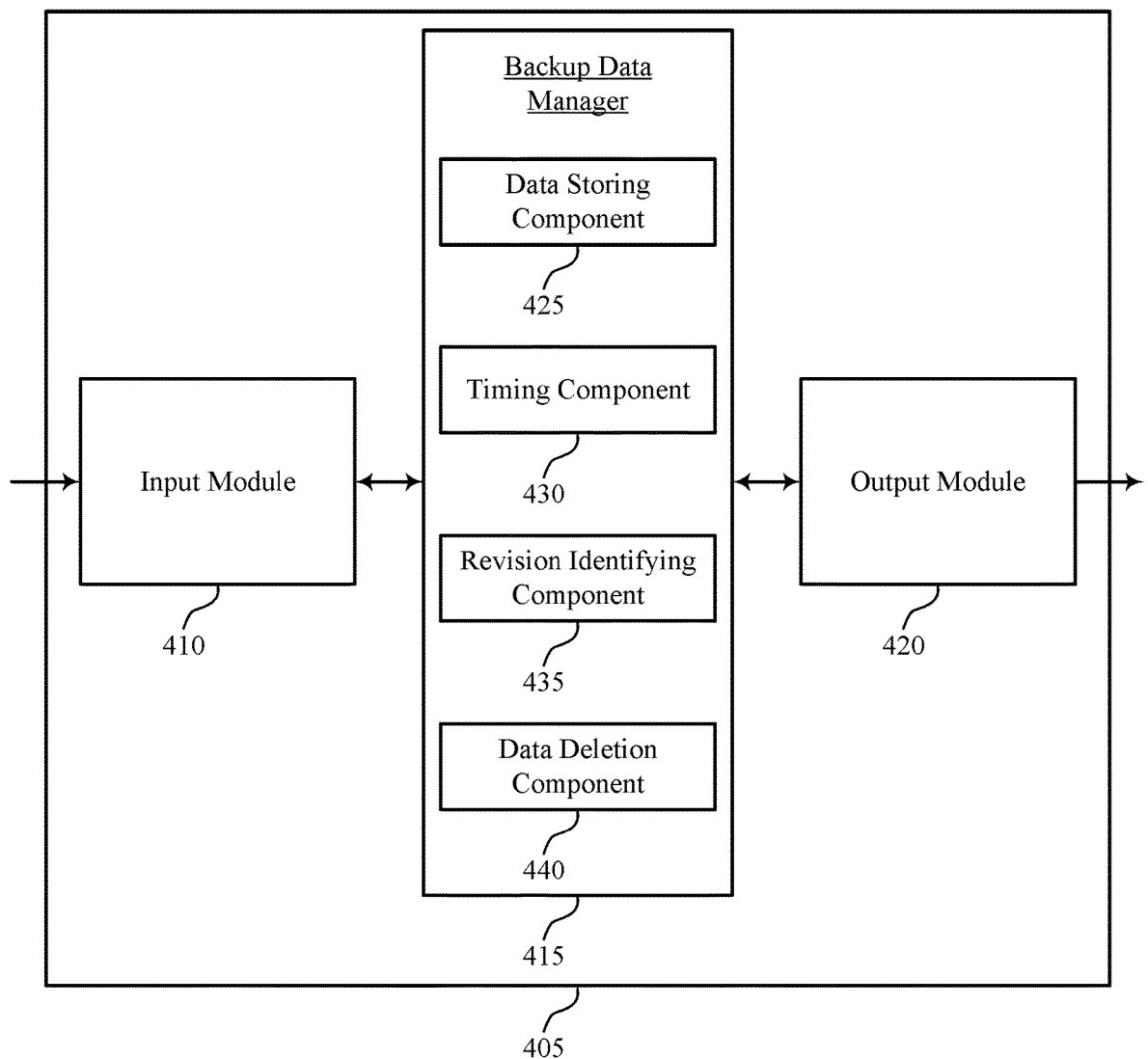
FIG. 4 illustrates a block diagram of a system that supports reducing granularity of backup data over time in accordance with aspects of the present disclosure.

FIG. 4 shows a block diagram 400 of a system 405 that supports reducing granularity of backup data over time in accordance with various aspects of the present disclosure. System 405 may include input module 410, backup data manager 415, and output module 420. System 405 may also include a processor. Each of these components may be in communication with one another (e.g., via one or more buses). In some cases, system 405 may be an example of a user terminal, a database server, or a system containing multiple computing devices. Backup data manager 415 may be an example of aspects of the backup data manager 615 described with reference to FIGS. 5 and 6. Backup data manager 415 may also include data storing component 425, timing component 430, revision identifying component 435, and data deletion component 440.

Backup data manager 415 and/or at least some of its various sub-components may be implemented in hardware, software executed by a processor, firmware, or any combination thereof. If implemented in software executed by a processor, the functions of the backup data manager 415 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The backup data manager 415 and/or at least some of its various sub-components may be physically located at various positions, including being distributed such that portions of functions are implemented at different physical locations by one or more physical devices. In some examples, backup data manager 415 and/or at least some of its various sub-components may be a separate and distinct component in accordance with various aspects of the present disclosure. In other examples, backup data manager 415 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Data storing component 425 may store a set of database revisions at a database corresponding to a time period, store the set of database revisions at a second database corresponding to the time period, and update the baseline version periodically. In some cases, the set of database revisions includes a change log that indicates changes to a baseline version. In some cases, the database includes an HBase database.

Timing component 430 may determine that a threshold time has passed since an expiration of the time period, identify a set of time intervals within the time period, where a periodicity of the set of time intervals is based on the threshold time, determine that a second threshold time has passed since the expiration of the time period, where the second threshold time is greater than the threshold time, and identify a second set of time intervals within the time period, where a periodicity of the second set of time intervals is based on the second threshold time, and where the periodicity of the second set of time intervals is longer than the periodicity of the set of time intervals.

Revision identifying component 435 may identify, for each of the set of time intervals, at most one database revision corresponding to the time interval and identify, for each of the second set of time intervals, at most one second database revision corresponding to the time interval. In some cases, the identified at most one database revision from each of the set of time intervals is later in time than all other database revisions in each of the set of time intervals.

Data deletion component 440 may delete, for each of the set of time intervals, all of the database revisions corresponding to the time interval except for the identified at most one database revision from the database, based on the determination that the threshold time has passed, delete, for each of the set of time intervals, all of the database revisions corresponding to the time interval except for the identified at most one second database revision from the database, based on the determination that the second threshold time has passed, and perform a compaction of the database, where the compaction includes rewriting each data element of the database unless the data element is marked with a delete marker. In some cases, the deleting, for each of the set of time intervals, all of the database revisions corresponding to the time interval except for the identified at most one database revision from the database includes marking each of the database revisions corresponding to the time interval except for the identified at most one database revision with a delete marker.

Figure 5:
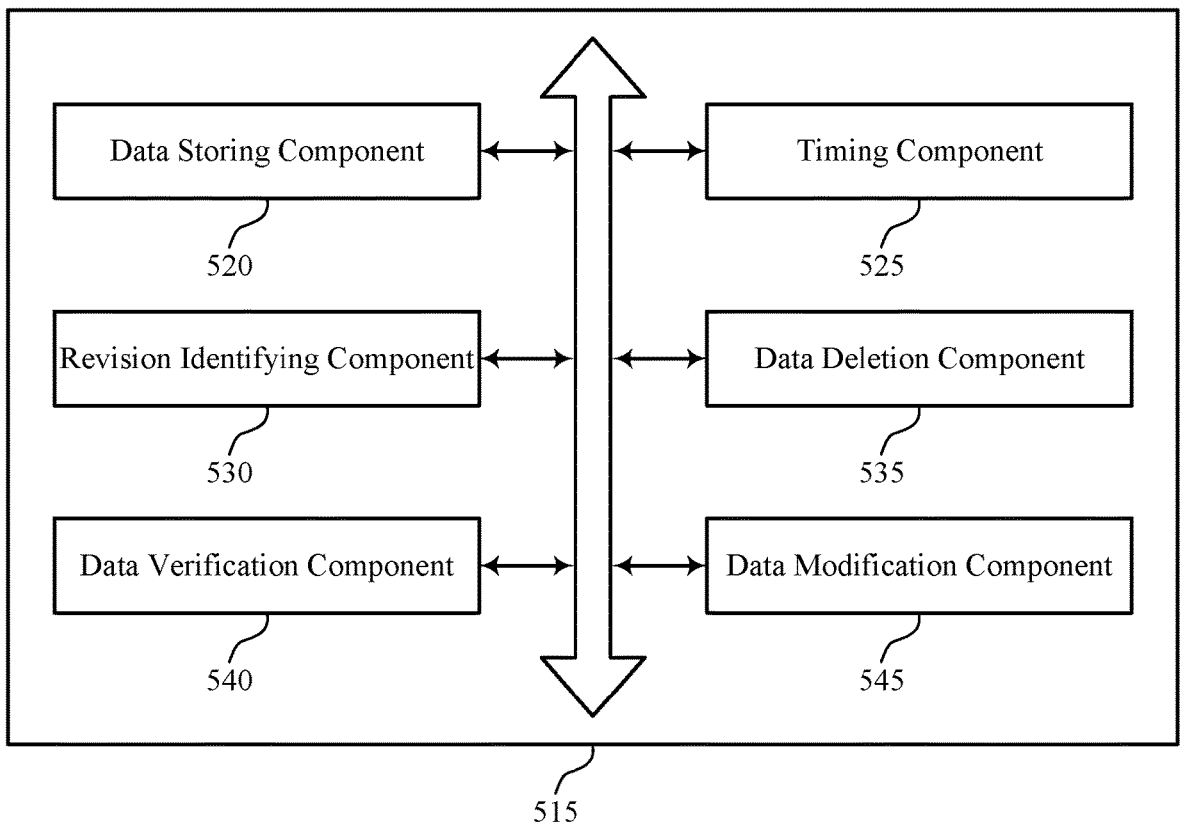
FIG. 5 illustrates a block diagram of a backup data manager that supports reducing granularity of backup data over time in accordance with aspects of the present disclosure.

FIG. 5 shows a block diagram 500 of a backup data manager 515 that supports reducing granularity of backup data over time in accordance with various aspects of the present disclosure. The backup data manager 515 may be an example of aspects of a backup data manager 615 described with reference to FIGS. 4 and 6. The backup data manager 515 may include data storing component 520, timing component 525, revision identifying component 530, data deletion component 535, data verification component 540, and data modification component 545. Each of these modules may communicate, directly or indirectly, with one another (e.g., via one or more buses).

Data storing component 520 may store a set of database revisions at a database corresponding to a time period, store the set of database revisions at a second database corresponding to the time period, and update the baseline version periodically. In some cases, the set of database revisions includes a change log that indicates changes to a baseline version. In some cases, the database includes an HBase database.

Timing component 525 may determine that a threshold time has passed since an expiration of the time period, identify a set of time intervals within the time period, where a periodicity of the set of time intervals is based on the threshold time, determine that a second threshold time has passed since the expiration of the time period, where the second threshold time is greater than the threshold time, and identify a second set of time intervals within the time period, where a periodicity of the second set of time intervals is based on the second threshold time, and where the periodicity of the second set of time intervals is longer than the periodicity of the set of time intervals.

Revision identifying component 530 may identify, for each of the set of time intervals, at most one database revision corresponding to the time interval and identify, for each of the second set of time intervals, at most one second database revision corresponding to the time interval. In some cases, the identified at most one database revision from each of the set of time intervals is later in time than all other database revisions in each of the set of time intervals.

Data deletion component 535 may delete, for each of the set of time intervals, all of the database revisions corresponding to the time interval except for the identified at most one database revision from the database, based on the determination that the threshold time has passed, delete, for each of the set of time intervals, all of the database revisions corresponding to the time interval except for the identified at most one second database revision from the database, based on the determination that the second threshold time has passed, and perform a compaction of the database, where the compaction includes rewriting each data element of the database unless the data element is marked with a delete marker. In some cases, the deleting, for each of the set of time intervals, all of the database revisions corresponding to the time interval except for the identified at most one database revision from the database includes marking each of the database revisions corresponding to the time interval except for the identified at most one database revision with a delete marker.

Data verification component 540 may perform a first checksum operation for the set of database revisions at the database, perform a second checksum operation for the set of database revisions at the second database, and compare a result of the first checksum operation to a result of the second checksum operation. In some cases, the first checksum operation and the second checksum operation include order-independent checksum operations.

Data modification component 545 may determine whether to modify the set of database revisions stored at the database or the set of database revisions stored at the second database based on the comparing the result of the first checksum operation to the result of the second checksum operation and modify either the set of database revisions stored at the database or the set of database revisions stored at the second database.

Figure 6:
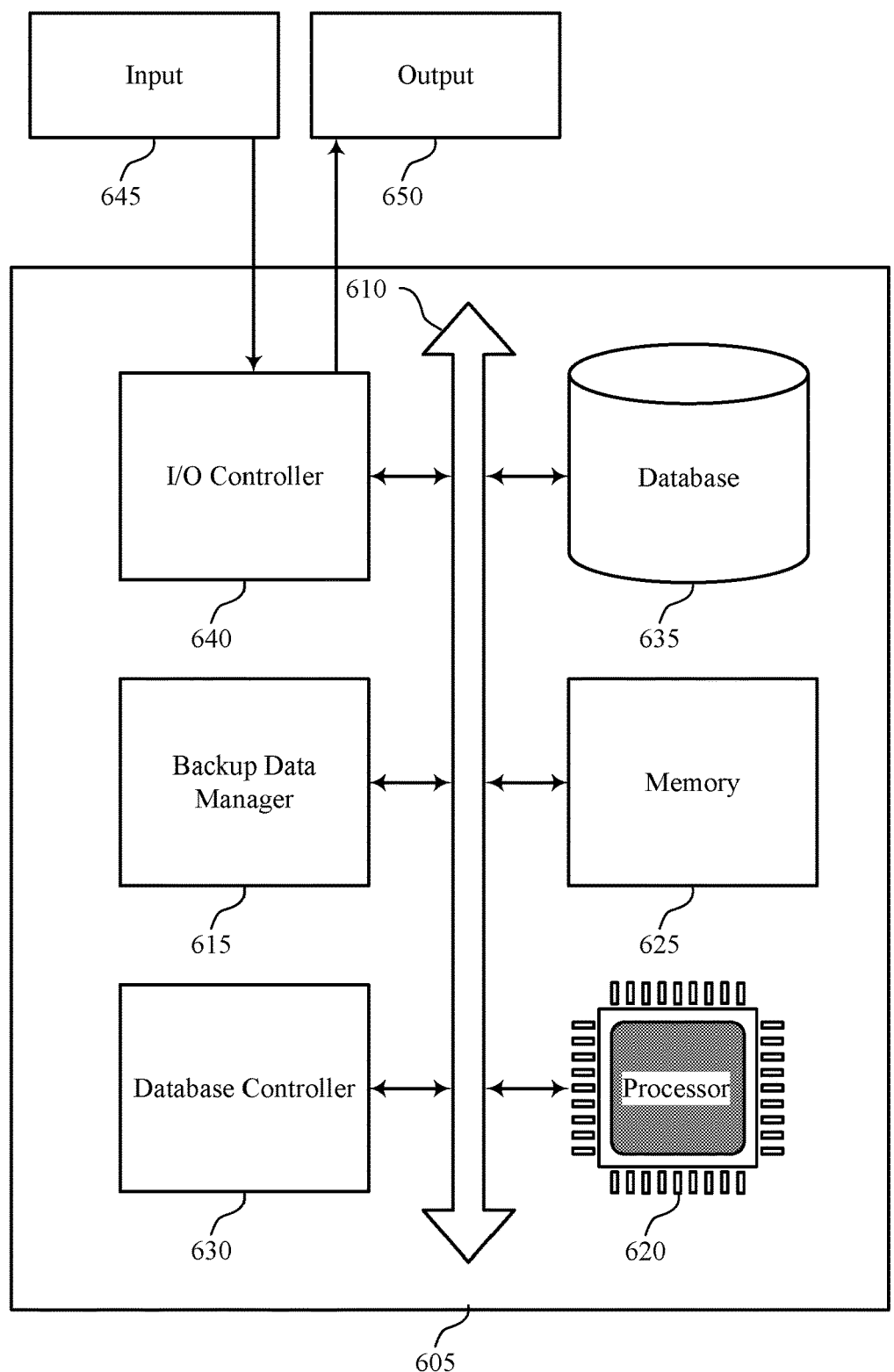
FIG. 6 illustrates a block diagram of an environment including a backup data manager that supports reducing granularity of backup data over time in accordance with aspects of the present disclosure.

FIG. 6 shows a diagram of an environment 600 including a system 605 that supports reducing granularity of backup data over time in accordance with various aspects of the present disclosure. System 605 may be an example of or include the components of a system 125 as described above, e.g., with reference to FIG. 1. System 605 may include components for bi-directional data communications including components for transmitting and receiving communications, including backup data manager 615, processor 620, memory 625, database controller 630, database 635, and I/O controller 640. These components may be in electronic communication via one or more busses (e.g., bus 610).

Processor 620 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 620 may be configured to operate a memory array using a memory controller. In other cases, a memory controller may be integrated into processor 620. Processor 620 may be configured to execute computer-readable instructions stored in a memory to perform various functions (e.g., functions or tasks supporting reducing granularity of backup data over time).

Memory 625 may include random access memory (RAM) and read only memory (ROM). The memory 625 may store computer-readable, computer-executable software 630 including instructions that, when executed, cause the processor to perform various functions described herein. In some cases, the memory 625 may contain, among other things, a basic input/output system (BIOS) which may control basic hardware and/or software operation such as the interaction with peripheral components or devices.

Database controller 630 may manage data storage and processing in database 635. In some cases, a user may interact with database controller 630. In other cases, database controller 630 may operate automatically without user interaction. Database 635 may be an example of a single database, a distributed database, multiple distributed databases, or an emergency backup database. I/O controller 640 may manage input and output signals for device 605. I/O controller 640 may also manage peripherals not integrated into device 605. In some cases, I/O controller 640 may represent a physical connection or port to an external peripheral. In some cases, I/O controller 640 may utilize an operating system such as iOS®, ANDROID®, MS-DOS®, MS-WINDOWS®, OS/2®, UNIX®, LINUX®, or another known operating system. In other cases, I/O controller 640 may represent or interact with a modem, a keyboard, a mouse, a touchscreen, or a similar device. In some cases, I/O controller 640 may be implemented as part of a processor. In some cases, a user may interact with device 605 via I/O controller 640 or via hardware components controlled by I/O controller 640.

Figure 7:
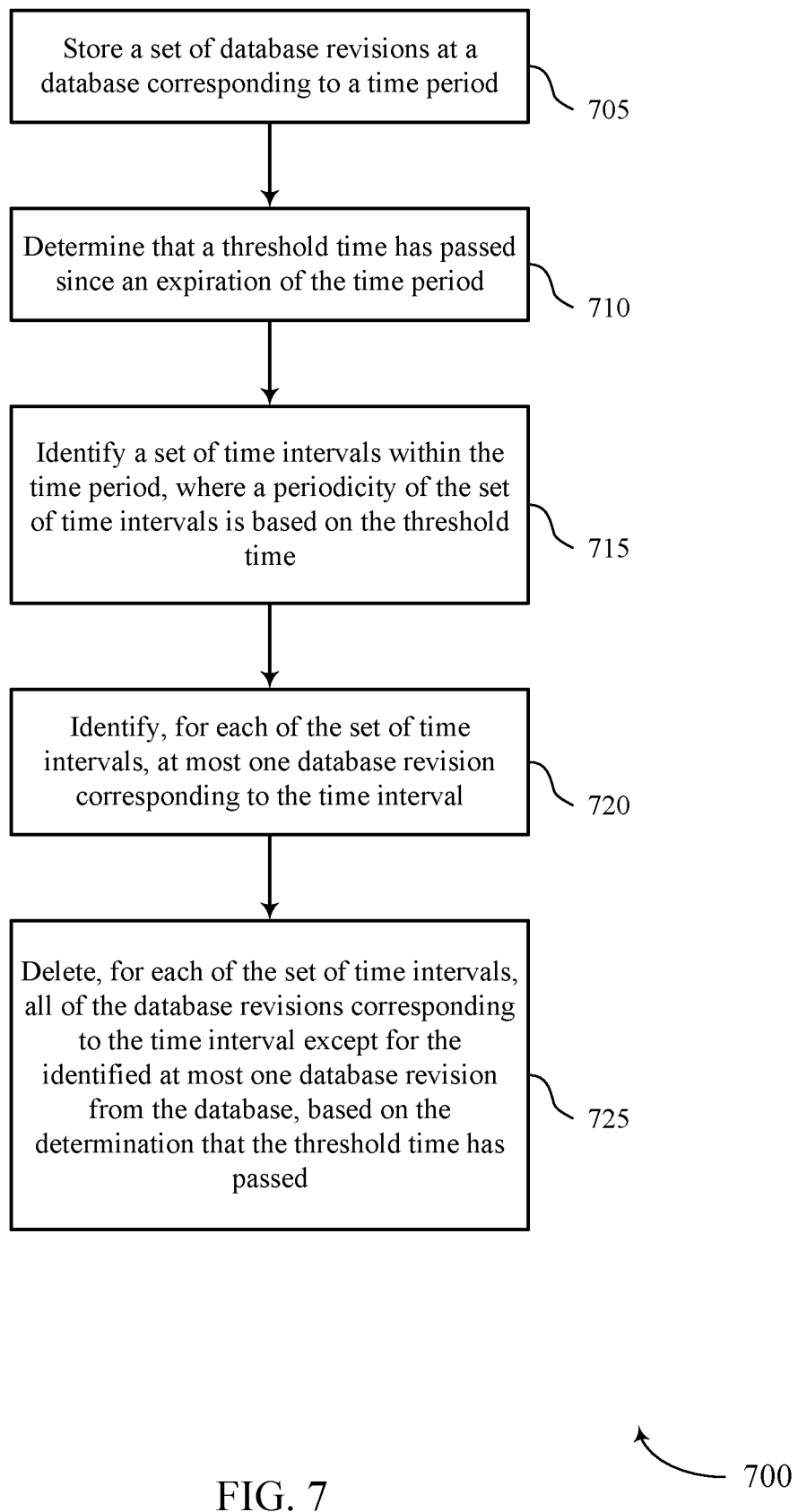
FIGS. 7 through 10 illustrate methods for reducing granularity of backup data over time in accordance with aspects of the present disclosure.

FIG. 7 shows a flowchart illustrating a method 700 for reducing granularity of backup data over time in accordance with various aspects of the present disclosure. The operations of method 700 may be implemented by a backup data manager or its components as described herein. For example, the operations of method 700 may be performed by a backup data manager 415, 515, or 615 as described with reference to FIGS. 4 through 6. In some examples, a backup data manager may execute a set of codes to control the functional elements of the device to perform the functions described below. Additionally or alternatively, the backup data manager may perform aspects of the functions described below using special-purpose hardware.

At block 705 the backup data manager 415, 515, or 615 may store a plurality of database revisions at a database corresponding to a time period. The operations of block 705 may be performed according to the methods described with reference to FIGS. 1 through 3. In certain examples, aspects of the operations of block 705 may be performed by a data storing component as described with reference to FIGS. 4 through 6.

At block 710 the backup data manager 415, 515, or 615 may determine that a threshold time has passed since an expiration of the time period. The operations of block 710 may be performed according to the methods described with reference to FIGS. 1 through 3. In certain examples, aspects of the operations of block 710 may be performed by a timing component as described with reference to FIGS. 4 through 6.

At block 715 the backup data manager 415, 515, or 615 may identify a plurality of time intervals within the time period, wherein a periodicity of the plurality of time intervals is based at least in part on the threshold time. The operations of block 715 may be performed according to the methods described with reference to FIGS. 1 through 3. In certain examples, aspects of the operations of block 715 may be performed by a timing component as described with reference to FIGS. 4 through 6.

At block 720 the backup data manager 415, 515, or 615 may identify, for each of the plurality of time intervals, at most one database revision corresponding to the time interval. The operations of block 720 may be performed according to the methods described with reference to FIGS. 1 through 3. In certain examples, aspects of the operations of block 720 may be performed by a revision identifying component as described with reference to FIGS. 4 through 6.

At block 725 the backup data manager 415, 515, or 615 may delete, for each of the plurality of time intervals, all of the database revisions corresponding to the time interval except for the identified at most one database revision from the database, based at least in part on the determination that the threshold time has passed. The operations of block 725 may be performed according to the methods described with reference to FIGS. 1 through 3. In certain examples, aspects of the operations of block 725 may be performed by a data deletion component as described with reference to FIGS. 4 through 6.

Figure 8:
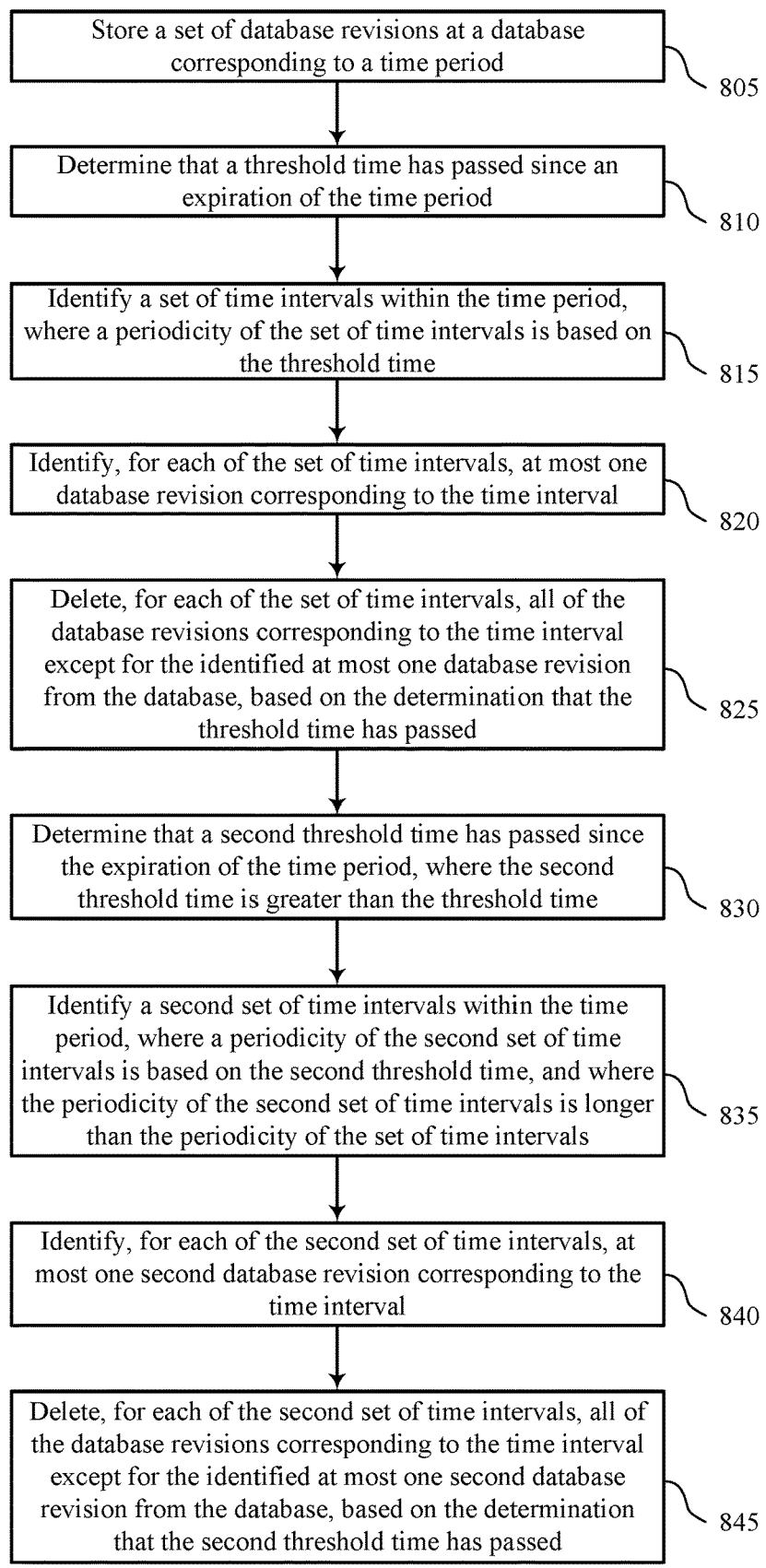

FIG. 8 shows a flowchart illustrating a method 800 for reducing granularity of backup data over time in accordance with various aspects of the present disclosure. The operations of method 800 may be implemented by a backup data manager or its components as described herein. For example, the operations of method 800 may be performed by a backup data manager 415, 515, or 615 as described with reference to FIGS. 4 through 6. In some examples, a backup data manager may execute a set of codes to control the functional elements of the device to perform the functions described below. Additionally or alternatively, the backup data manager may perform aspects of the functions described below using special-purpose hardware.

At block 805 the backup data manager 415, 515, or 615 may store a plurality of database revisions at a database corresponding to a time period. The operations of block 805 may be performed according to the methods described with reference to FIGS. 1 through 3. In certain examples, aspects of the operations of block 805 may be performed by a data storing component as described with reference to FIGS. 4 through 6.

At block 810 the backup data manager 415, 515, or 615 may determine that a threshold time has passed since an expiration of the time period. The operations of block 810 may be performed according to the methods described with reference to FIGS. 1 through 3. In certain examples, aspects of the operations of block 810 may be performed by a timing component as described with reference to FIGS. 4 through 6.

At block 815 the backup data manager 415, 515, or 615 may identify a plurality of time intervals within the time period, wherein a periodicity of the plurality of time intervals is based at least in part on the threshold time. The operations of block 815 may be performed according to the methods described with reference to FIGS. 1 through 3. In certain examples, aspects of the operations of block 815 may be performed by a timing component as described with reference to FIGS. 4 through 6.

At block 820 the backup data manager 415, 515, or 615 may identify, for each of the plurality of time intervals, at most one database revision corresponding to the time interval. The operations of block 820 may be performed according to the methods described with reference to FIGS. 1 through 3. In certain examples, aspects of the operations of block 820 may be performed by a revision identifying component as described with reference to FIGS. 4 through 6.

At block 825 the backup data manager 415, 515, or 615 may delete, for each of the plurality of time intervals, all of the database revisions corresponding to the time interval except for the identified at most one database revision from the database, based at least in part on the determination that the threshold time has passed. The operations of block 825 may be performed according to the methods described with reference to FIGS. 1 through 3. In certain examples, aspects of the operations of block 825 may be performed by a data deletion component as described with reference to FIGS. 4 through 6.

At block 830 the backup data manager 415, 515, or 615 may determine that a second threshold time has passed since the expiration of the time period, wherein the second threshold time is greater than the threshold time. The operations of block 830 may be performed according to the methods described with reference to FIGS. 1 through 3. In certain examples, aspects of the operations of block 830 may be performed by a timing component as described with reference to FIGS. 4 through 6.

At block 835 the backup data manager 415, 515, or 615 may identify a second plurality of time intervals within the time period, wherein a periodicity of the second plurality of time intervals is based at least in part on the second threshold time, and wherein the periodicity of the second plurality of time intervals is longer than the periodicity of the plurality of time intervals. The operations of block 835 may be performed according to the methods described with reference to FIGS. 1 through 3. In certain examples, aspects of the operations of block 835 may be performed by a timing component as described with reference to FIGS. 4 through 6.

At block 840 the backup data manager 415, 515, or 615 may identify, for each of the second plurality of time intervals, at most one second database revision corresponding to the time interval. The operations of block 840 may be performed according to the methods described with reference to FIGS. 1 through 3. In certain examples, aspects of the operations of block 840 may be performed by a revision identifying component as described with reference to FIGS. 4 through 6.

At block 845 the backup data manager 415, 515, or 615 may delete, for each of the second plurality of time intervals, all of the database revisions corresponding to the time interval except for the identified at most one second database revision from the database, based at least in part on the determination that the second threshold time has passed. The operations of block 845 may be performed according to the methods described with reference to FIGS. 1 through 3. In certain examples, aspects of the operations of block 845 may be performed by a data deletion component as described with reference to FIGS. 4 through 6.

Figure 9:
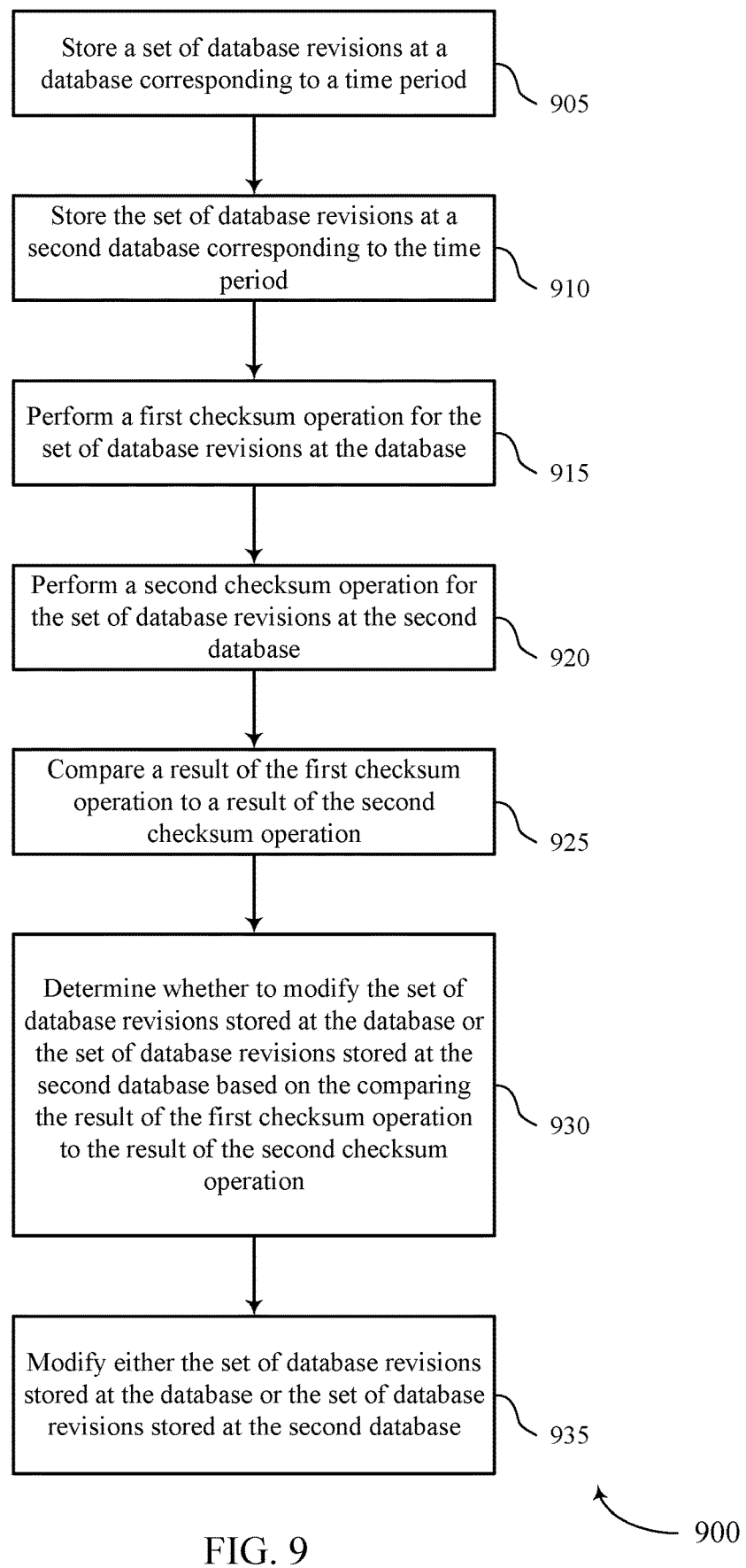

FIG. 9 shows a flowchart illustrating a method 900 for reducing granularity of backup data over time in accordance with various aspects of the present disclosure. The operations of method 900 may be implemented by a backup data manager or its components as described herein. For example, the operations of method 900 may be performed by a backup data manager 415, 515, or 615 as described with reference to FIGS. 4 through 6. In some examples, a backup data manager may execute a set of codes to control the functional elements of the device to perform the functions described below. Additionally or alternatively, the backup data manager may perform aspects of the functions described below using special-purpose hardware.

At block 905 the backup data manager 415, 515, or 615 may store a plurality of database revisions at a database corresponding to a time period. The operations of block 905 may be performed according to the methods described with reference to FIGS. 1 through 3. In certain examples, aspects of the operations of block 905 may be performed by a data storing component as described with reference to FIGS. 4 through 6.

At block 910 the backup data manager 415, 515, or 615 may store the plurality of database revisions at a second database corresponding to the time period. The operations of block 910 may be performed according to the methods described with reference to FIGS. 1 through 3. In certain examples, aspects of the operations of block 910 may be performed by a data storing component as described with reference to FIGS. 4 through 6.

At block 915 the backup data manager 415, 515, or 615 may perform a first checksum operation for the plurality of database revisions at the database. The operations of block 915 may be performed according to the methods described with reference to FIGS. 1 through 3. In certain examples, aspects of the operations of block 915 may be performed by a data verification component as described with reference to FIGS. 4 through 6.

At block 920 the backup data manager 415, 515, or 615 may perform a second checksum operation for the plurality of database revisions at the second database. The operations of block 920 may be performed according to the methods described with reference to FIGS. 1 through 3. In certain examples, aspects of the operations of block 920 may be performed by a data verification component as described with reference to FIGS. 4 through 6.

At block 925 the backup data manager 415, 515, or 615 may compare a result of the first checksum operation to a result of the second checksum operation. The operations of block 925 may be performed according to the methods described with reference to FIGS. 1 through 3. In certain examples, aspects of the operations of block 925 may be performed by a data verification component as described with reference to FIGS. 4 through 6.

At block 930 the backup data manager 415, 515, or 615 may determine whether to modify the plurality of database revisions stored at the database or the plurality of database revisions stored at the second database based at least in part on the comparing the result of the first checksum operation to the result of the second checksum operation. The operations of block 930 may be performed according to the methods described with reference to FIGS. 1 through 3. In certain examples, aspects of the operations of block 930 may be performed by a data modification component as described with reference to FIGS. 4 through 6.

At block 935 the backup data manager 415, 515, or 615 may modify either the plurality of database revisions stored at the database or the plurality of database revisions stored at the second database. The operations of block 935 may be performed according to the methods described with reference to FIGS. 1 through 3. In certain examples, aspects of the operations of block 935 may be performed by a data modification component as described with reference to FIGS. 4 through 6.

Figure 10:
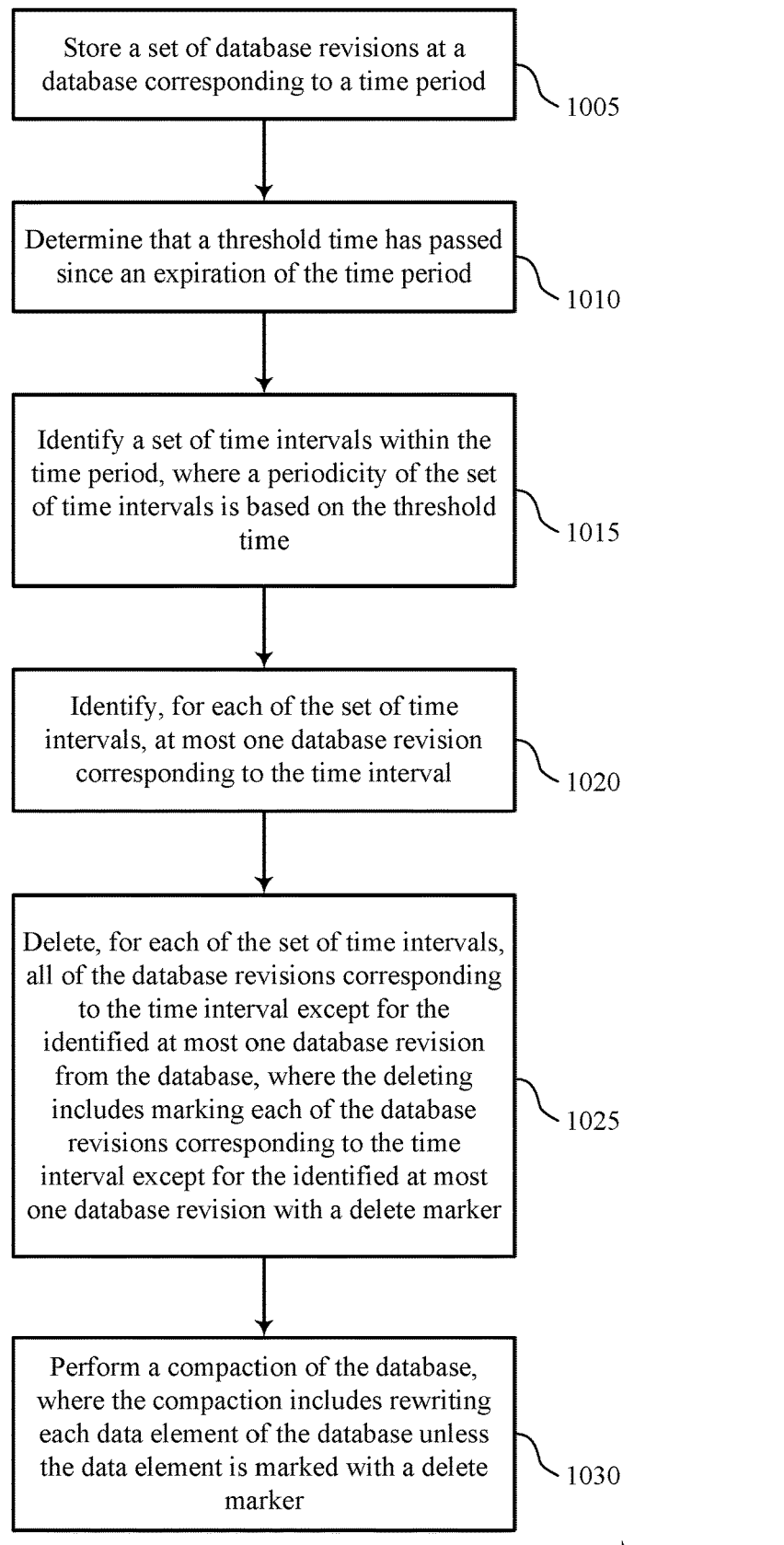

FIG. 10 shows a flowchart illustrating a method 1000 for reducing granularity of backup data over time in accordance with various aspects of the present disclosure. The operations of method 1000 may be implemented by a backup data manager or its components as described herein. For example, the operations of method 1000 may be performed by a backup data manager 415, 515, or 615 as described with reference to FIGS. 4 through 6. In some examples, a backup data manager may execute a set of codes to control the functional elements of the device to perform the functions described below. Additionally or alternatively, the backup data manager may perform aspects of the functions described below using special-purpose hardware.

At block 1005 the backup data manager 415, 515, or 615 may store a plurality of database revisions at a database corresponding to a time period. The operations of block 1005 may be performed according to the methods described with reference to FIGS. 1 through 3. In certain examples, aspects of the operations of block 1005 may be performed by a data storing component as described with reference to FIGS. 4 through 6.

At block 1010 the backup data manager 415, 515, or 615 may determine that a threshold time has passed since an expiration of the time period. The operations of block 1010 may be performed according to the methods described with reference to FIGS. 1 through 3. In certain examples, aspects of the operations of block 1010 may be performed by a timing component as described with reference to FIGS. 4 through 6.

At block 1015 the backup data manager 415, 515, or 615 may identify a plurality of time intervals within the time period, wherein a periodicity of the plurality of time intervals is based at least in part on the threshold time. The operations of block 1015 may be performed according to the methods described with reference to FIGS. 1 through 3. In certain examples, aspects of the operations of block 1015 may be performed by a timing component as described with reference to FIGS. 4 through 6.

At block 1020 the backup data manager 415, 515, or 615 may identify, for each of the plurality of time intervals, at most one database revision corresponding to the time interval. The operations of block 1020 may be performed according to the methods described with reference to FIGS. 1 through 3. In certain examples, aspects of the operations of block 1020 may be performed by a revision identifying component as described with reference to FIGS. 4 through 6.

At block 1025 the backup data manager 415, 515, or 615 may delete, for each of the plurality of time intervals, all of the database revisions corresponding to the time interval except for the identified at most one database revision from the database, based at least in part on the determination that the threshold time has passed. The deleting may comprise marking each of the database revisions corresponding to the time interval except for the identified at most one database revision with a delete marker. The operations of block 1025 may be performed according to the methods described with reference to FIGS. 1 through 3. In certain examples, aspects of the operations of block 1025 may be performed by a data deletion component as described with reference to FIGS. 4 through 6.

At block 1030 the backup data manager 415, 515, or 615 may perform a compaction of the database, wherein the compaction comprises rewriting each data element of the database unless the data element is marked with a delete marker. The operations of block 1030 may be performed according to the methods described with reference to FIGS. 1 through 3. In certain examples, aspects of the operations of block 1030 may be performed by a data deletion component as described with reference to FIGS. 4 through 6.

A method of data storage is described. The method may include storing a plurality of database revisions at a database corresponding to a time period, determining that a threshold time has passed since an expiration of the time period, identifying a plurality of time intervals within the time period, wherein a periodicity of the plurality of time intervals is based at least in part on the threshold time, identifying, for each of the plurality of time intervals, at most one database revision corresponding to the time interval, and deleting, for each of the plurality of time intervals, all of the database revisions corresponding to the time interval except for the identified at most one database revision from the database, based at least in part on the determination that the threshold time has passed.

Another apparatus for data storage is described. The apparatus may include a processor, memory in electronic communication with the processor, and instructions stored in the memory. The instructions may be operable to cause the processor to store a plurality of database revisions at a database corresponding to a time period, determine that a threshold time has passed since an expiration of the time period, identify a plurality of time intervals within the time period, wherein a periodicity of the plurality of time intervals is based at least in part on the threshold time, identify, for each of the plurality of time intervals, at most one database revision corresponding to the time interval, and delete, for each of the plurality of time intervals, all of the database revisions corresponding to the time interval except for the identified at most one database revision from the database, based at least in part on the determination that the threshold time has passed.

A non-transitory computer readable medium for data storage is described. The non-transitory computer-readable medium may include instructions operable to cause a processor to store a plurality of database revisions at a database corresponding to a time period, determine that a threshold time has passed since an expiration of the time period, identify a plurality of time intervals within the time period, wherein a periodicity of the plurality of time intervals is based at least in part on the threshold time, identify, for each of the plurality of time intervals, at most one database revision corresponding to the time interval, and delete, for each of the plurality of time intervals, all of the database revisions corresponding to the time interval except for the identified at most one database revision from the database, based at least in part on the determination that the threshold time has passed.

Some examples of the method, apparatus, and non-transitory computer-readable medium described above may further include processes, features, means, or instructions for determining that a second threshold time may have passed since the expiration of the time period, wherein the second threshold time may be greater than the threshold time. Some examples of the method, apparatus, and non-transitory computer-readable medium described above may further include processes, features, means, or instructions for identifying a second plurality of time intervals within the time period, wherein a periodicity of the second plurality of time intervals may be based at least in part on the second threshold time, and wherein the periodicity of the second plurality of time intervals may be longer than the periodicity of the plurality of time intervals. Some examples of the method, apparatus, and non-transitory computer-readable medium described above may further include processes, features, means, or instructions for identifying, for each of the second plurality of time intervals, at most one second database revision corresponding to the time interval. Some examples of the method, apparatus, and non-transitory computer-readable medium described above may further include processes, features, means, or instructions for deleting, for each of the second plurality of time intervals, all of the database revisions corresponding to the time interval except for the identified at most one second database revision from the database, based at least in part on the determination that the second threshold time may have passed.

Some examples of the method, apparatus, and non-transitory computer-readable medium described above may further include processes, features, means, or instructions for storing the plurality of database revisions at a second database corresponding to the time period. Some examples of the method, apparatus, and non-transitory computer-readable medium described above may further include processes, features, means, or instructions for performing a first checksum operation for the plurality of database revisions at the database. Some examples of the method, apparatus, and non-transitory computer-readable medium described above may further include processes, features, means, or instructions for performing a second checksum operation for the plurality of database revisions at the second database. Some examples of the method, apparatus, and non-transitory computer-readable medium described above may further include processes, features, means, or instructions for comparing a result of the first checksum operation to a result of the second checksum operation. Some examples of the method, apparatus, and non-transitory computer-readable medium described above may further include processes, features, means, or instructions for determining whether to modify the plurality of database revisions stored at the database or the plurality of database revisions stored at the second database based at least in part on the comparing the result of the first checksum operation to the result of the second checksum operation. Some examples of the method, apparatus, and non-transitory computer-readable medium described above may further include processes, features, means, or instructions for modifying either the plurality of database revisions stored at the database or the plurality of database revisions stored at the second database.

In some examples of the method, apparatus, and non-transitory computer-readable medium described above, the first checksum operation and the second checksum operation comprise order-independent checksum operations.

In some examples of the method, apparatus, and non-transitory computer-readable medium described above, the deleting, for each of the plurality of time intervals, all of the database revisions corresponding to the time interval except for the identified at most one database revision from the database comprises marking each of the database revisions corresponding to the time interval except for the identified at most one database revision with a delete marker.

Some examples of the method, apparatus, and non-transitory computer-readable medium described above may further include processes, features, means, or instructions for performing a compaction of the database, wherein the compaction comprises rewriting each data element of the database unless the data element may be marked with a delete marker.

In some examples of the method, apparatus, and non-transitory computer-readable medium described above, the plurality of database revisions comprises a change log that indicates changes to a baseline version.

Some examples of the method, apparatus, and non-transitory computer-readable medium described above may further include processes, features, means, or instructions for updating the baseline version periodically.

In some examples of the method, apparatus, and non-transitory computer-readable medium described above, the identified at most one database revision from each of the plurality of time intervals may be later in time than all other database revisions in each of the plurality of time intervals.

In some examples of the method, apparatus, and non-transitory computer-readable medium described above, the database comprises an HBase database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data storage, comprising:
storing a plurality of database revisions according to a granularity at a database for a fixed time period, wherein each of the plurality of database revisions corresponds to a different change to at least one data object of the database during the fixed time period;
determining that a first threshold time has passed since an expiration of the fixed time period;
identifying a first plurality of time intervals within the fixed time period based at least in part on the first threshold time having passed;
identifying, within each first time interval of the first plurality of time intervals that includes at least one database revision, a most recent database revision;
reducing the granularity of the plurality of database revisions stored for the fixed time period based at least in part on deleting, for each of the first plurality of time intervals that includes at least one database revision, all database revisions except for the identified most recent database revision;
determining that a second threshold time greater than the first threshold time has passed since the expiration of the fixed time period;
identifying a second plurality of time intervals within the fixed time period based at least in part on the second threshold time having passed, wherein each of the second plurality of time intervals is longer than each of the first plurality of time intervals;
identifying, within each second time interval of the second plurality of time intervals that includes at least one database revision, the most recent database revision; and
further reducing the granularity of the plurality of database revisions stored for the fixed time period based at least in part on deleting, for each of the second plurality of time intervals that includes at least one database revision, all database revisions except for the identified most recent database revision.

2. The method of claim 1, further comprising:
storing the plurality of database revisions at a second database corresponding to the fixed time period;
performing a first checksum operation for the plurality of database revisions at the database;
performing a second checksum operation for the plurality of database revisions at the second database;
comparing a result of the first checksum operation to a result of the second checksum operation;
determining whether to modify the plurality of database revisions stored at the database or the plurality of database revisions stored at the second database based at least in part on the comparing the result of the first checksum operation to the result of the second checksum operation; and
modifying either the plurality of database revisions stored at the database or the plurality of database revisions stored at the second database.

3. The method of claim 2, wherein the first checksum operation and the second checksum operation comprise order-independent checksum operations.

4. The method of claim 1, wherein deleting, for the first plurality of time intervals comprises:
marking each database revision within each of the first plurality of time intervals that includes the at least one database revision, except for the identified most recent database revision, with a delete marker.

5. The method of claim 4, further comprising:
performing a compaction of the database, wherein the compaction comprises rewriting each data element of the database unless the data element is marked with the delete marker.

6. The method of claim 1, wherein the plurality of database revisions comprises a change log that indicates changes to a baseline version.

7. The method of claim 6, further comprising:
updating the baseline version periodically.

8. The method of claim 1, wherein the database comprises an HBase database.

9. An apparatus for data storage, in a system comprising:
a processor;
memory in electronic communication with the processor; and
instructions stored in the memory and operable, when executed by the processor, to cause the apparatus to:
store a plurality of database revisions according to a granularity at a database for a fixed time period, wherein each of the plurality of database revisions corresponds to a different change to at least one data object of the database during the fixed time period;
determine that a first threshold time has passed since an expiration of the fixed time period;
identify a first plurality of time intervals within the fixed time period based at least in part on the first threshold time having passed;
identify, within each first time interval of the first plurality of time intervals that includes at least one database revision, a most recent database revision;
reduce the granularity of the plurality of database revisions stored for the fixed time period based at least in part on deleting, for each of the first plurality of time intervals that includes at least one database revision, all database revisions except for the identified most recent database revision;
determine that a second threshold time greater than the first threshold time has passed since the expiration of the fixed time period;
identify a second plurality of time intervals within the fixed time period based at least in part on the second threshold time having passed, wherein each of the second plurality of time intervals is longer than each of the first plurality of time intervals;
identify, within each second time interval of the second plurality of time intervals that includes at least one database revision, the most recent database revision; and
further reduce the granularity of the plurality of database revisions stored for the fixed time period based at least in part on deleting, for each of the second plurality of time intervals that includes at least one database revision, all database revisions except for the identified most recent database revision.

10. The apparatus of claim 9, wherein the instructions are further executable by the processor to:
store the plurality of database revisions at a second database corresponding to the fixed time period;
perform a first checksum operation for the plurality of database revisions at the database;
perform a second checksum operation for the plurality of database revisions at the second database;
compare a result of the first checksum operation to a result of the second checksum operation;

determine whether to modify the plurality of database revisions stored at the database or the plurality of database revisions stored at the second database based at least in part on the comparing the result of the first checksum operation to the result of the second checksum operation; and modify either the plurality of database revisions stored at the database or the plurality of database revisions stored at the second database.

11. The apparatus of claim 9, wherein the instructions to delete, for the first plurality of time intervals are further executable by the processor to cause the apparatus to:

mark each database revision within each of the first plurality of time intervals that includes the at least one database revision, except for the identified most recent database revision, with a delete marker.

12. The apparatus of claim 11, wherein the instructions are further executable by the processor to:

perform a compaction of the database, wherein the compaction comprises rewriting each data element of the database unless the data element is marked with the delete marker.

13. A non-transitory computer readable medium storing code for data storage, the code comprising instructions executable by a processor to:

store a plurality of database revisions according to a granularity at a database for a fixed time period, wherein each of the plurality of database revisions corresponds to a different change to at least one data object of the database during the fixed time period;

determine that a first threshold time has passed since an expiration of the fixed time period;

identify a first plurality of time intervals within the fixed time period based at least in part on the first threshold time having passed;

identify, within each first time interval of the first plurality of time intervals that includes at least one database revision, a most recent database revision;

reduce the granularity of the plurality of database revisions stored for the fixed time period based at least in part on deleting, for each of the first plurality of time intervals that includes at least one database revision, all database revisions except for the identified most recent database revision;

determine that a second threshold time greater than the first threshold time has passed since the expiration of the fixed time period;

identify a second plurality of time intervals within the fixed time period based at least in part on the second threshold time having passed, wherein each of the second plurality of time intervals is longer than each of the first plurality of time intervals;

identify, within each second time interval of the second plurality of time intervals that includes at least one database revision, the most recent database revision; and further reduce the granularity of the plurality of database revisions stored for the fixed time period based at least in part on deleting, for each of the second plurality of time intervals that includes at least one database revision, all database revisions except for the identified most recent database revision.

14. The non-transitory computer-readable medium of claim 13, wherein the instructions are further executable by the processor to:

store the plurality of database revisions at a second database corresponding to the fixed time period;

perform a first checksum operation for the plurality of database revisions at the database;

perform a second checksum operation for the plurality of database revisions at the second database;

compare a result of the first checksum operation to a result of the second checksum operation;

determine whether to modify the plurality of database revisions stored at the database or the plurality of database revisions stored at the second database based at least in part on the comparing the result of the first checksum operation to the result of the second checksum operation; and modify either the plurality of database revisions stored at the database or the plurality of database revisions stored at the second database.

15. The non-transitory computer-readable medium of claim 13, wherein the instructions to delete, for the first plurality of time intervals are further executable by the processor to:

mark each database revision within each of the first plurality of time intervals that includes the at least one database revision, except for the identified most recent database revision, with a delete marker.

16. The non-transitory computer-readable medium of claim 15, wherein the instructions are further executable by the processor to:

perform a compaction of the database, wherein the compaction comprises rewriting each data element of the database unless the data element is marked with the delete marker.

* * * * *